United States Patent [19]

Honeycutt

[11] Patent Number: 4,574,097

[45] Date of Patent: Mar. 4, 1986

[54] REINFORCED THIXOTROPIC GEL COMPOSITION

[75] Inventor: Travis W. Honeycutt, Irvine, Calif.

[73] Assignee: Isopedix Corporation, Irvine, Calif.

[21] Appl. No.: 639,339

[22] Filed: Aug. 10, 1984

[51] Int. Cl.$^4$ ................................................ C08K 3/36
[52] U.S. Cl. ...................................... 428/36; 428/262; 523/207; 523/209; 524/533; 524/538; 524/539; 524/706; 524/710; 524/733; 524/773; 524/784; 524/785; 524/790; 524/796; 524/147; 524/139; 524/167; 524/401; 524/404; 524/414
[58] Field of Search ............... 524/850, 733, 533, 538, 524/539, 706, 710, 773, 784, 785, 790, 796; 523/209, 207; 128/90; 428/36, 262

[56] References Cited

U.S. PATENT DOCUMENTS

| | | | |
|---|---|---|---|
| 3,178,379 | 4/1965 | Wicker et al. | 524/850 |
| 3,354,128 | 11/1967 | Wicker | 524/850 |
| 3,896,077 | 7/1975 | Leonard et al. | 524/850 |
| 4,125,494 | 11/1978 | Schoenberg et al. | 524/850 |
| 4,139,693 | 2/1979 | Schoenberg | 526/279 |
| 4,440,910 | 4/1984 | O'Connor | 524/850 |
| 4,477,607 | 10/1984 | Litke | 524/850 |

FOREIGN PATENT DOCUMENTS 56-95968  8/1981  Japan ................... 524/850

*Primary Examiner*—Lewis T. Jacobs
*Attorney, Agent, or Firm*—Limbach, Limbach & Sutton

[57] ABSTRACT

A thixotropic gel composition comprising an α-cyanoacrylate monomer, stabilizer, plasticizer and free radical scavenger is improved with the addition of fibers, spheres or mixtures of the same of certain materials which are insoluble in and inert to the α-cyanoacrylate monomer. The fibers or spheres composed of such materials as polyolefins, polyesters or polyamides enhance the physical and chemical characteristics of the thixotropic gel.

26 Claims, No Drawings

REINFORCED THIXOTROPIC GEL COMPOSITION

DESCRIPTION

1. Technical Field of Invention

The thixotropic gel compositions of the present invention are ideally suited for use as adhesives and hardening agents. Although adhesives composed principally of α-cyanoacrylate monomers are well known, the fabrication of a thixotropic gel which is reinforced with certain fibers or spheres or mixtures thereof has heretofore been undisclosed by the prior art.

2. Background of the Invention

It has long been known that adhesive compositions containing monomeric α-cyanoacrylates exhibit high strength bonding characteristics for all kinds of materials, such as glass, metals, plastics, rubber, wood, cement, paper and cloth. The mechanism by which the cyanoacrylates function as adhesives is not completely understood but it is thought that the adhesive properties are attributable to the rapidity with which thin films of the monomeric α-cyanoacrylates autopolymerize in the absence of heat, light or polymerization catalyst. When two surfaces are placed together with a thin film of a monomeric α-cyanoacrylate between them, the monomer rapidly polymerizes and forms a highly tenacious bond.

Characteristically, α-cyanoacrylate-containing adhesive compositions exhibit a rather low viscosity. Although low viscosity may be considered beneficial for certain applications, when placed upon smooth vertical surfaces, the α-cyanoacrylate-containing adhesives tend to run and streak. When considering the fact that these materials are highly reactive and exothermic, it readily becomes apparent that it may be desirable to provide a thickened, gel-like consistency to the adhesive composition.

In co-pending U.S. application Ser. No. 639,340, filed on Aug. 10, 1984, a novel α-cyanoacrylate gel composition was disclosed. The recited composition differed from prior thickened α-cyanoacrylate compositions such as those disclosed in U.S. Pat. No. 3,178,379 and U.S. Pat. No. 2,794,788 in the use of a dry colloidal fumed silica, together with a plasticizer, stabilizer and free radical scavenger. The result was a composition which was not only thickened but more stable without loss of reactivity and which exhibited rheological thixotropic properties as compared to the compositions of the cited prior art.

Although it is believed that the thixotropic gel composition disclosed in applicant's co-pending application is far superior to compositions of the prior art, it has been determined that even further improvements could be made. For example, α-cyanoacrylate compositions tend to exhibit a certain degree of brittleness and lack of shock resistance resulting in their tendency to crack and pull away from a support surface under an applied bending or shear force. Applicant has also disclosed in co-pending U.S. application Ser. No. 532,352, filed on Sept. 13, 1983, the use of α-cyanoacrylate compositions as hardening agents on a fabric support in the manufacture of an orthosis or substitute for a plaster-of-paris cast. Due to the brittleness and lack of toughness of presently available cyanoacrylate-containing compositions, their use as hardening agents in medical appliances has been limited.

It is thus an object of the present invention to provide an α-cyanoacrylate-containing composition which is improved over similar compositions of the prior art.

It is yet a further object of the present invention to provide an α-cyanoacrylate-containing composition exhibiting not only a gel consistency and thixotropic characteristics but which is also tougher and more shock resistant than corresponding compositions of the prior art. The improved composition of the present invention further provides strain relief to the polymerized gel when used as an adhesive or hardening agent.

These and further objects will be more readily appreciated when considering the following disclosure.

SUMMARY OF THE INVENTION

A thixotropic gel composition is disclosed which comprises:

A. an α-cyanoacrylate monomer of the formula

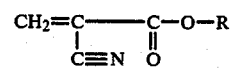

wherein R is a member selected from the group consisting of an alkyl from approximately 1 to 16 carbon atoms such as methyl, ethyl, propyl, iso-propyl, butyl, iso-butyl and amyl; phenyl, cyclohexyl, alkoxyalkyl such as methoxyethyl and ethoxy-ethyl, allyl and furfuryl groups;

B. dry colloidal fumed silica;

C. a plasticizer comprising a member selected from the group consisting of monofunctional aliphatic esters, difunctional aliphatic esters, difunctional aromatic esters, phosphate esters, phosphonate esters and other well known plasticizers;

D. a stabilizer comprising a member selected from the group consisting of sulfur dioxide, hydrogen fluoride, phosphorous acid, boron trifluoride, stannic chloride, ferric chloride, sultones and aromatic sulfonic acids;

E. a free radical scavenger comprising a member selected from the group consisting of hydroquinone, monoethylether of hydroquinone, butylated hydroxyanisole, butylated hydroxytoluene and t-butyl hydroquinone; and F. a filler in the form of fibers or spheres or mixtures of fibers and spheres characterized as being substantially insoluble in and inert to the α-cyanoacrylate monomer and comprising one or more members selected from the group consisting of synthetic fibers such as polyolefins, polytetrafluoroethylene, polyesters and polyamides and natural fibers such as cellulose, which have been treated with a material such as trimethyl chlorosiloxane to render said fibers inert to said α-cyanoacrylate monomer. Any other fibers or spheres can be used with active OH groups which have been rendered chemically neutral to α-cyanoacrylate monomers by silation, esterification or etherification.

DETAILED DESCRIPTION OF THE INVENTION

As previously noted, Applicant's co-pending U.S. application Ser. No. 639,340, filed on Aug. 10, 1984, thoroughly discloses and claims Applicant's thixotropic gel composition containing an α-cyanoacrylate monomer, a dry colloidal fumed silica, plasticizer, stabilizer and free radical scavenger. The use of a filler, in the form of fibers or spheres, however, represents the contribution to the art disclosed and claimed herein and, as such, sufficient detail will be devoted to those constituents hereinafter.

Generally, both the fibers and spheres can be composed of the same or different and either.

Although virtually any α-cyanoacrylate monomer recognized by the prior art as being useful as an adhesive can be employed in practicing the present invention, it has been found that the present invention be limited to the use of only a dry colloidal fumed silica as the thickening and thixotropic forming agent. More specifically, this ingredient is preferably a hydrophobic silated silica, as the inclusion of any water will decrease the stability and shelf life of the composition. It has been found that a product sold under the trademark CAB-O-SIL N 70 TS available from cabot corporation is most adequate in practicing the present invention.

It is useful that a plasticizer be employed in the present composition. Without a plasticizer, phase separation occurs during storage, particularly at lower weight percentage levels of silica, resulting in a product which is commercially unacceptable. Plasticizers for use herein comprise one or more members selected from the group consisting of mono-functional aliphatic esters, such as butyl acetate and butyl cyanoacetate, di-functional aliphatic esters, such as dibutyl phthalate, phosphate esters and phosphonate esters. Although dibutyl and dioctyl phthlate are preferable in carrying out the present invention, one could use 3,4,5-trihydroxybenzoic acid and its esters as taught in U.S. Pat. No. 4,139,693 among others known in the trade.

To further enhance the stability of the composition disclosed and claimed herein, a stabilizer is optionally included. Suitable stabilizers for practicing the present invention comprise one or more members selected from the group consisting of sulfur dioxide, hydrogen fluoride, nitrogen oxide, phosphoric acid, phosphorus acid, boron trifluoride, stannic chloride, ferric chloride, sultones, and aromatic sulfonic acids.

As α-cyanoacrylates can polymerize via the free radical route, to enhance self life, it is preferable that a free radical scavenger be included in the composition. Such scavengers include hydroquinone, monoethyl ether of hydroquinone, butylated hyroxyanisole, butylated hydroxytoluene, and t-butyl hydroquinone. Hydroquinone is the preferred free radical scavenger for use herein.

Finally, as a means of controlling the viscosity of the thixotrope under shear, certain viscosity modifiers can be included in the formulation. Examples of such materials are polyethylcyanoacrylate or other polymeric cyanoacrylates, polymethylmethacrylate and cellulose esters. Polymethylmethacrylate is preferred.

Generally, both the fibers and spheres can be composed of the same or different materials and either physical form can be included as part of the thixotropic gel composition, alone or in combination with the other. Said fibers and spheres can also be employed to reinforce and strengthen α-cyanoacrylate monomer-containing compositions. It is imperative that, to maintain the stability of the α-cyanoacrylate monomer composition, the fibers or spheres be composed of material which is inert to the monomers. As such, the fibers and spheres must not have any significant amounts of residual catalyst, such as peroxides, which are used in certain manufacturing techniques for polyolefins, etc. Thus, although not an absolute requirement, it is preferable to employ fibers and spheres which were thermally polymerized and not catalytically polymerized in their manufacture. In view of their inertness and relative availability, it has been found that thermally polymerized polypropylene spheres sold under the trade designation TYPE 6501 from Himont U.S.A., Inc. and fibers of spun polypropylene sold under the trade designation TYPE 153 from Hercules Chemical Co., which is produced from thermally polymerized feed stock, are most advantageous for use in practicing the present invention.

Although a wide latitude can be employed in the selection of fibers and spheres of varying physical dimension, it has been found appropriate to employ fibers of a length between approximately 0.1 to 10.0 mm, more preferably between approximately 2.0 to 6.0 mm, and most preferably between 3.0 and 4.0 mm. Further, fibers of a denier between approximately 0.25 to 20.0 can be employed, while it is more preferable to use fibers of a denier between approximately 1.5 to 15.0 and most preferable to provide fibers having a denier between approximately 3.0 to 6.0.

It has been found appropriate to employ spheres of approximately 40 to 300 mesh although, ideally, spheres of 170 mesh can be used. Concerning concentrations, the spheres can be employed at levels less than about 40 weight percent based upon the weight of the entire composition, while from approximately 5.0 to 15.0 weight percent is ideal. The fibers, on the other hand, should be present at levels of approximately 0.1 to 50.0 weight percent, while levels of approximately 1.0 to 25.0 weight percent are more preferable and the range between approximately 5.0 to 10.0 weight percent is ideal.

Broadly, the fibers and spheres described above can be simply added by bulk addition to the solvent-based composition. However, in light of the extreme sensitivity of cyanoacrylate monomers to ionic impurities and to water, it is preferable that the fibers and spheres be treated prior to their inclusion in the α-cyanoacrylate monomer-containing system. As such, it is preferable to add the fibers and spheres to a container of a non-ionic low boiling solvent such as benzene, toluene, xylene, hexane, chloroform, dichloromethane, acetone, ethylene dichloride and ethyl acetate. Once the solvent and other impurities such as ethoxylated fatty acids are removed by filtering the fibers or beads therefrom, further volatile materials such as gaseous HCl in water are stripped from the fibers or beads by heating the filtrate under vacuum with or without the addition of additional solvent.

EXAMPLE 1

A flask was fitted with a magnetic stirrer and charged with 500 mls of benzene. Although 90 to 95 parts by weight of the α-cyanoacrylate monomer can be employed, in this example 92 parts of ethoxy ethyl α-cyanoacrylate was added to the flask containing solvent and stabilized with 0.003 parts by weight sulfur dioxide. At substantially the same time, the cyanoacrylate was protected with 0.07 parts by weight of hydroquinone as the free radical scavenger. The viscosity of the composition under shear was regulated by the addition of 0.5 parts by weight polymethyl methacrylate as well as 1 part by weight dibutyl phthalate as a plasticizer to maintain a single phase.

Approximately 10 parts by weight polypropylene spheres of 170 mesh in size were washed with approximately 10 to 20 times their weight of benzene and filtered therefrom. After filtering, an equal amount of benzene was again added to the spheres and removed by vacuum stripping. When the benzene was substantially all removed and the spheres appeared to be dry, further drying was continued in an oven at 100° C. under continued vacuum. These spheres were next added to the composition under normal mixing. While agitated, 6 parts by weight Cabot's CAB-O-SIL N 70 TS was added slowly.

The above-recited composition was continuously stirred for approximately 45 minutes and the solvent vacuum stripped at approximately 2 mm/Hg from the solids. The solvent was stripped from the solution by fitting the flask with dry nitrogen gas and vacuum lines and the pressure reduced to approximately 2 mm/Hg while sparging the vessel with dry nitrogen gas to facilitate stripping of the solvent. To enhance solvent removal, it is noted that the composition can be warmed to increase the vapor pressure of the solvent.

EXAMPLE 2

The composition of Example 1 was prepared with the use of fibers rather than spheres. In this instance, approximately 7 weight percent polypropylene fibers having a denier of 5.0 and a length of approximately 3.5 mm was added to a flask containing approximately 10 to 20 times their weight of benzene. The fibers were filtered from the benzene and then re-submerged in an equal amount of fresh benzene. The solvent was then thereupon vacuum stripped from the fibers whereupon the fibers were placed within an oven and their temperature elevated to approximately 100° C under continued vacuum. The fibers were then combined with the above-recited composition while stirring.

EXAMPLE 3

A 40-year old man's right arm was padded with Isopedix's Stockinette prior to the application of a Pro-set tubular cast to said arm.

A two-foot length of the fabric of U.S. application Ser. No. 504,892, filed June 16, 1983, abandoned, was cut from a roll and appropriate incisions were made to accommodate the thumb. The first layer was rolled onto the patient's right arm with the correct juxtaposition of the thumb to the cast. One ounce of the reinforced gel prepared according to Example 1 was carefully and evenly smeared onto the cast, covering the entire area except for ¼" areas near the thumb and ends of the cast. A second layer of fabric was rolled onto the arm and one ounce of reinforced gel was evenly applied as before. The cast was then gently spritzed with approximately ¼ ml of catalyst to reduce surface tackiness and in 10 minutes the cast was substantially firm. Within 30 minutes the cast significantly resisted manual bending.

The use of fibers or spheres in practicing the present invention provides for certain advantages in the physical and chemical properties of a final thixotropic gel, which are truly unexpected. The use of the claimed additives provide strain relief and shock resistance as compared to compositions not containing the claimed fibers or spheres. Cyanoacrylate-based compositions are characteristically brittle and tend to release from a subsurface upon the application of a modest strain or shear. By the incorporation of inert fibers or spheres, the tendencies to crack and separate are greatly reduced.

Inert fibers and spheres provide for further benefits and act as reinforcing agents to increase the toughness of the gel. These materials act as fillers and thus reduce the cost of the overall thixotropic gel for certain α-cyanoacrylate monomers tend to cost as much as 30 or more times as much as the cost of fibers and spheres of polyolefins and similar materials. In addition, cyanoacrylates tend to exhibit an offensive odor which is reduced through the use of inert fibers or spheres pursuant to this invention. These materials enhance the thixotropic properties of the gel, resulting in a need for less of the dry colloidal fumed silica than otherwise while also reducing the tendency for phase separation.

The invention has been described with considerable detail with particular reference to certain preferred embodiments thereof, but it will be understood that variations and modifications can be effected within the spirit and scope of the invention as described hereinabove and as described in the appended claims.

I claim:

1. A thixotropic gel composition comprising
   A. an α-cyanoacrylate monomer of the formula

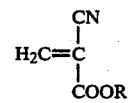

wherein R is a member selected from the group consisting of an alkyl from approximately 1 to 16carbon atoms; phenyl, cyclohexyl, alkoxy-alkyl, allyl and furfuryl groups;
   B. dry colloidal fumed silica;
   C. a plasticizer;
   D. a stabilizer;
   E. a free radical scavenger; and
   F. a filler in the form of fibers or spheres or mixtures of fibers and spheres substantially insoluble in and inert to said α-cyanoacrylate monomer.

2. The composition of claim 1 wherein said filler comprises one or more members selected from the group consisting of polyolefins, polyesters, polytetrafluoroethylene, polyamides and cellulose.

3. The composition of claim 2 wherein said cellulose has been treated with triethyl chlorosiloxane.

4. A thixotropic gel composition comprising:
   A. an α-cyanoacrylate monomer of the formula

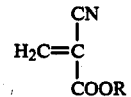

wherein R is a member selected from the group consisting of an alkyl from approximately 1 to 16 carbon atoms; phenyl, cyclohexyl, alkoxy, allyl and furfuryl groups;
   B. dry colloidal fumed silica;
   C. a plasticizer comprising a member selected from the group consisting of monofunctional aliphatic esters, difunctional aliphatic esters, difunctional aromatic esters, phosphate esters and phosphonate esters;
   D. a stabilizer comprising a member selected from the group consisting of sulfur dioxide, hydrogen fluoride, phosphorous acid, boron trifluoride, stannic chloride, ferric chloride, sultones and aromatic sulfonic acids;

E. a free radical scavenger comprising a member selected from the group consisting of hydroquinone, monoethylether of hydroquinone, butylated hydroxyanisole, butylated hydroxytoluene and t-butyl hydroquinone; and F. a filler in the form of fibers or spheres or mixtures of fibers and spheres characterized as being substantially insoluble in and inert to the α-cyanoacrylate monomer and comprising one or more members selected from the group consisting of polyolefins, polyesters, polytetrafluoroethylene and polyamides and cellulose.

5. The composition of claim 4 wherein said polyolefins comprise a member selected from the group consisting of polypropylene and polyethylene.

6. The composition of claim 1 wherein said fibers are of a length between approximately 0.1 to 10.0 mm.

7. The composition of claim 1 wherein said fibers are of a length between approximately 2.0 to 6.0 mm.

8. The composition of claim 1 wherein said fibers are of a length between approximately 3.0 to 4.0 mm.

9. The composition of claim 1 wherein said fibers are of a denier between approximately 0.25 to 20.

10. The composition of claim 1 wherein said fibers are of a denier between approximately 1.5 to 15.

11. The composition of claim 1 wherein said fibers are of a denier between approximately 3.0 to 6.0.

12. The composition of claim 1 wherein said spheres are approximately 40 to 300 mesh in size.

13. The composition of claim 1 wherein said spheres are approximately 170 mesh in size.

14. The composition of claim 1 wherein said fibers are present in said composition at levels of approximately 0.1 to 50.0 weight percent.

15. The composition of claim 1 wherein said fibers are present in said composition at levels of approximately 1.0 to 25.0 weight percent.

16. The composition of claim 1 wherein said fibers are present in said composition at levels of approximately 5.0 to 10.0 weight percent.

17. The composition of claim 1 wherein said spheres are present in said composition at levels of approximately less than 40 weight percent.

18. The composition of claim 1 wherein said spheres are present in said composition at levels of approximately 5.0 to 15.0 weight percent.

19. The composition of claim 1 wherein said fibers and spheres are first washed with a non-ionic low boiling point solvent which is filtered from the fibers and spheres before their addition to said composition.

20. The composition of claim 19 wherein subsequent to said filtering step, said spheres and fibers are re-washed with a non-ionic low boiling point solvent which is substantially removed by vacuum stripping or oven drying.

21. The composition of claim 20 wherein subsequent to vacuum stripping, said fibers and spheres are heated under vacuum to further remove said non-ionic low boiling point solvent and other volatile contaminants.

22. The composition of claim 19 wherein said solvent comprises a member selected from the group consisting of benzene, toluene, xylene, hexane, chloroform, dichloromethane, acetone, ethylene dichloride, ethyl acetate, 1,1,1,-trichloroethane, freon 113, perchloroethylene.

23. A thixotropic gel composition comprising:

A. an α-cyanoacrylate monomer of the formula

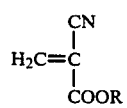

wherein R is a member selected from the group consisting of an alkyl from approximately 1 to 16 carbon atoms; phenyl, cyclohexyl, alkoxy, allyl and furfuryl groups;

B. a plasticizer;

C. a stabilizer;

D. a free radical scavenger; and

E. a filler in the form of fibers or spheres or mixtures of fibers and spheres characterized as being substantially insoluble in and inert to the α-cyanoacrylate monomer.

24. The composition of claim 23 wherein said filler comprises one or more members selected from the group consisting of polyolefins, polyesters, polytetrafluoroethylene, polyamides and cellulose.

25. A hardened member comprising a fabric support which has been coated with the composition of claim 1.

26. The hardened member of claim 25 wherein said fabric support is configured in the shape of a tubular cast.

* * * * *